(12) United States Patent
Lindström (10) Patent No.: US 12,509,133 B2
(45) Date of Patent: Dec. 30, 2025

(54) LOGISTICS SYSTEM

(71) Applicants: K. Hartwall Oy Ab, Söderkulla (FI);
Container Centralen A/S, Odense SV (DK)

(72) Inventor: Johan Lindström, Söderkulla (FI)

(73) Assignees: K. Hartwall Oy Ab, Söderkulla (FI);
Container Centralen A/S, Odense SV (DK)

( * ) Notice: Subject to any disclaimer, the term of this patent is extended or adjusted under 35 U.S.C. 154(b) by 930 days.

(21) Appl. No.: 16/977,171

(22) PCT Filed: Feb. 22, 2019

(86) PCT No.: PCT/FI2019/050144
§ 371 (c)(1),
(2) Date: Sep. 1, 2020

(87) PCT Pub. No.: WO2019/166692
PCT Pub. Date: Sep. 6, 2019

(65) Prior Publication Data
US 2021/0206412 A1    Jul. 8, 2021

(30) Foreign Application Priority Data
Mar. 1, 2018 (FI) .................................. 20185192

(51) Int. Cl.
*B62B 3/00* (2006.01)
*B62B 3/02* (2006.01)
(Continued)

(52) U.S. Cl.
CPC .............. *B62B 3/003* (2013.01); *B62B 3/025* (2013.01); *B65D 19/06* (2013.01); *B65D 19/42* (2013.01);
(Continued)

(58) Field of Classification Search
CPC ......... B62B 3/025; B62B 3/004; B62B 3/003; B62B 2205/006; B62B 5/0083;
(Continued)

(56) References Cited

U.S. PATENT DOCUMENTS 3,442,434 A * 5/1969 De Simas .............. B65D 19/20
206/521
3,664,570 A 5/1972 Kupersmit
(Continued)

FOREIGN PATENT DOCUMENTS

CN      202704088           1/2013
CN      202704088 U *       1/2013
(Continued)

OTHER PUBLICATIONS

CN-202704088-U English Translation (Year: 2013).*

*Primary Examiner* — Michael T. Walsh
(74) *Attorney, Agent, or Firm* — Chernoff, Vilhauer, McClung & Stenzel, LLP (57) ABSTRACT

A novel logistics system (1000) featuring a load carrier (100) and a cooperating superstructure (200) is proposed for transporting parcels. The load carrier has a deck (110) with a top load carrying surface (111) and a flank (112). The load carrier also has a plurality of locking protuberances (114) that extend from and are arranged spaced apart from one another on the load carrying surface (111) of the deck (110). The superstructure is a merchandising unit that is made of sheet material. The superstructure has first section (230) which is configured to extend from the load carrying surface (111) of the load carrier (100). The superstructure also has a plurality of receptive cavities (221) for receiving the respective plurality of locking protuberances (114) of the load carrier (100).

19 Claims, 6 Drawing Sheets

(51) Int. Cl.
  *B65D 19/06* (2006.01)
  *B65D 19/42* (2006.01)

(52) U.S. Cl.
  CPC .............. *B62B 2205/006* (2013.01); *B65D 2519/00159* (2013.01); *B65D 2519/00174* (2013.01); *B65D 2519/00308* (2013.01); *B65D 2519/00621* (2013.01); *B65D 2519/00641* (2013.01); *B65D 2519/00781* (2013.01)

(58) Field of Classification Search
  CPC .......... B65D 19/06; B65D 2519/00641; B65D 2519/00781; B65D 19/00; B65D 19/42; B65D 2519/00159; B65D 2519/00174; B65D 2519/00308; B65D 2519/00621; B65D 11/00; B65D 19/02
  See application file for complete search history.

(56) References Cited

U.S. PATENT DOCUMENTS

| | | | | |
|---|---|---|---|---|
| 4,936,451 A | * | 6/1990 | Shuert | B65D 19/06 |
| | | | | 206/386 |
| 5,123,541 A | | 6/1992 | Giannini et al. | |
| 5,564,599 A | * | 10/1996 | Barber | B65D 11/1853 |
| | | | | 222/105 |
| 5,722,328 A | * | 3/1998 | Darby | B65D 19/06 |
| | | | | 206/600 |
| 6,024,223 A | * | 2/2000 | Ritter | B65D 19/18 |
| | | | | 206/386 |
| 7,552,826 B2 | * | 6/2009 | Watanabe | B65D 19/02 |
| | | | | 24/457 |
| 11,542,061 B2 | * | 1/2023 | Shuert | B65D 19/38 |
| 2015/0108037 A1 | * | 4/2015 | Evans | B65D 19/18 |
| | | | | 108/50.11 |
| 2016/0332651 A1 | * | 11/2016 | Benning | B62B 3/003 |
| 2020/0369434 A1 | * | 11/2020 | Birnstihl | B65D 19/18 |

FOREIGN PATENT DOCUMENTS

| | | | | |
|---|---|---|---|---|
| DE | 9104762 U1 | * | 9/1992 | |
| EP | 1350728 A2 | | 8/2003 | |
| EP | 1524170 A2 | | 4/2005 | |
| EP | 4032821 A1 | * | 7/2022 | .............. A47F 5/114 |
| FR | 1592314 A | * | 5/1970 | |
| FR | 1592314 | | 6/1970 | |
| GB | 2024735 A | | 1/1980 | |
| GB | 2421479 A | | 6/2006 | |
| GB | 2444639 A | | 6/2008 | |
| JP | 2015151136 A | | 2/2014 | |

\* cited by examiner

LOGISTICS SYSTEM

FIELD

The present disclosure relates to logistics equipment. In particular, the invention relates to wheeled platforms, i.e. dollies, on which parceled goods are transported, stored temporarily, and merchandised.

BACKGROUND

There is known a vast variety of different devices used for transporting parceled goods. Typically pieces or stacks thereof are loaded onto a wheeled platform, on which they are conveyed to shop floor or storage. These wheeled platforms are called dollies. It is the continuous aim of the industry to pursue a lean supply chain from the factory to the retail location. This means that the products are packed to be "display ready", i.e. to be sold as packed in the factory. To facilitate such "display-ready" packaging, items are transported on dollies which are enclosed by a superstructure that has two functions. Firstly, the superstructure serves the purpose of supporting the stack of items and providing support for intermediate shelves. Secondly, the superstructure provides for a branding platform which may be printed or otherwise decorated so as to advertise the commercial origin of the product.

There is, however, demand for a developed logistics system that is not only sturdy but easy to assemble, i.e. the superstructure may be easily attached to the dolly.

SUMMARY

A novel logistics system is proposed with a load carrier and a cooperating superstructure. The load carrier has a deck with a top load carrying surface and a flank. The load carrier also has a plurality of locking protuberances that extend from and are arranged spaced apart from one another on the load carrying surface of the deck. The superstructure is a merchandising unit that is made of sheet material. The superstructure has first section which is configured to extend from the load carrying surface of the load carrier. The superstructure also has a plurality of receptive cavities for receiving the respective plurality of locking protuberances of the load carrier.

The invention is defined by the features of the independent claims. Some specific embodiments are defined in the dependent claims.

Considerable benefits are gained with aid of the present proposition. As the skirt of the superstructure extends along the load carrying surface of the deck and features a locking interface to the deck in the form of a male-female locking, the sturdiness of the logistics system is greatly improved compared to existing solutions. The locking interface serves the purpose preventing lateral displacement of the superstructure relative to the dolly as the tabs provide little such support. In addition, the superstructure is pressed against the load carrying surface by the cargo thus keeping the superstructure planted.

BRIEF DESCRIPTION OF THE DRAWINGS

In the following certain exemplary embodiments are described in greater detail with reference to the accompanying drawings, in which.

EMBODIMENTS

Hereafter is described certain embodiments of a novel proposition of introducing a partial rim on the deck of a dolly or other load carrier so as to provide lateral support for an overhead superstructure, such as a sleeve, box, or similar. The load carrier and superstructure may also have further locking interfaces for securing the superstructure to the load carrier.

Figure 1:
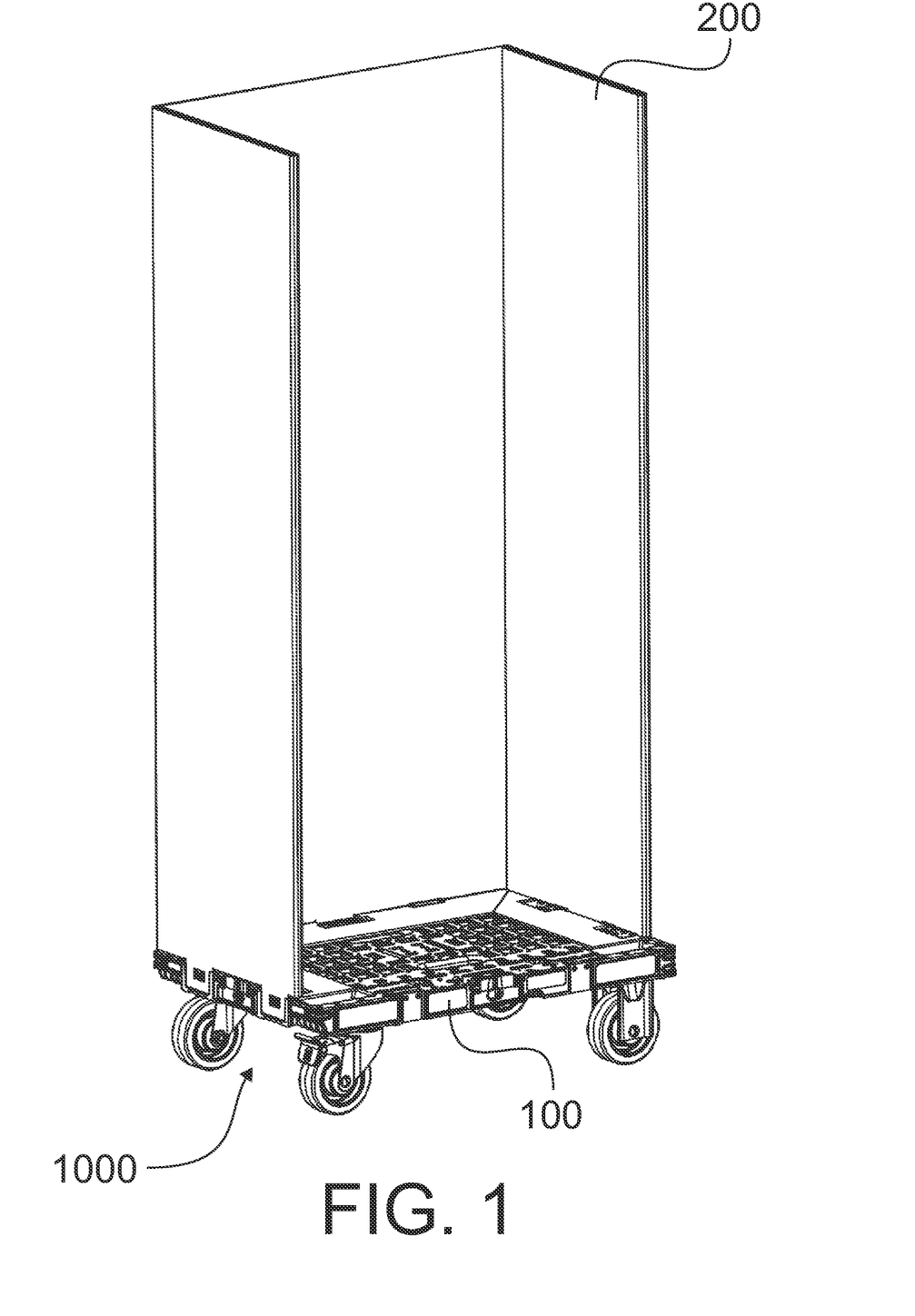
FIG. 1 illustrates a perspective view of a logistics system according to some embodiments.

As seen from FIG. 1, the logistics system 1000 according to some embodiments includes two major components, namely a load carrier 100 and a superstructure 200 attached thereto to facilitate merchandising the products carried on the load carrier 100. The embodiment shown in the FIGURES features a dolly as the load carrier but it should be understood that similarly a different pallet could be used instead, e.g. a non-rolling pallet optionally with stands instead of casters. For illustrative purposes, however, the interface between the load carrier and the superstructure is herein discussed with reference to the shown dolly. Similarly, the superstructure 200 is shown as a sleeve but it should be understood that equally applicable superstructures include boxes, hangers, refrigerating units, thermally insulating structures, crates, any reusable or disposable merchandising units, etc.

Figure 2:
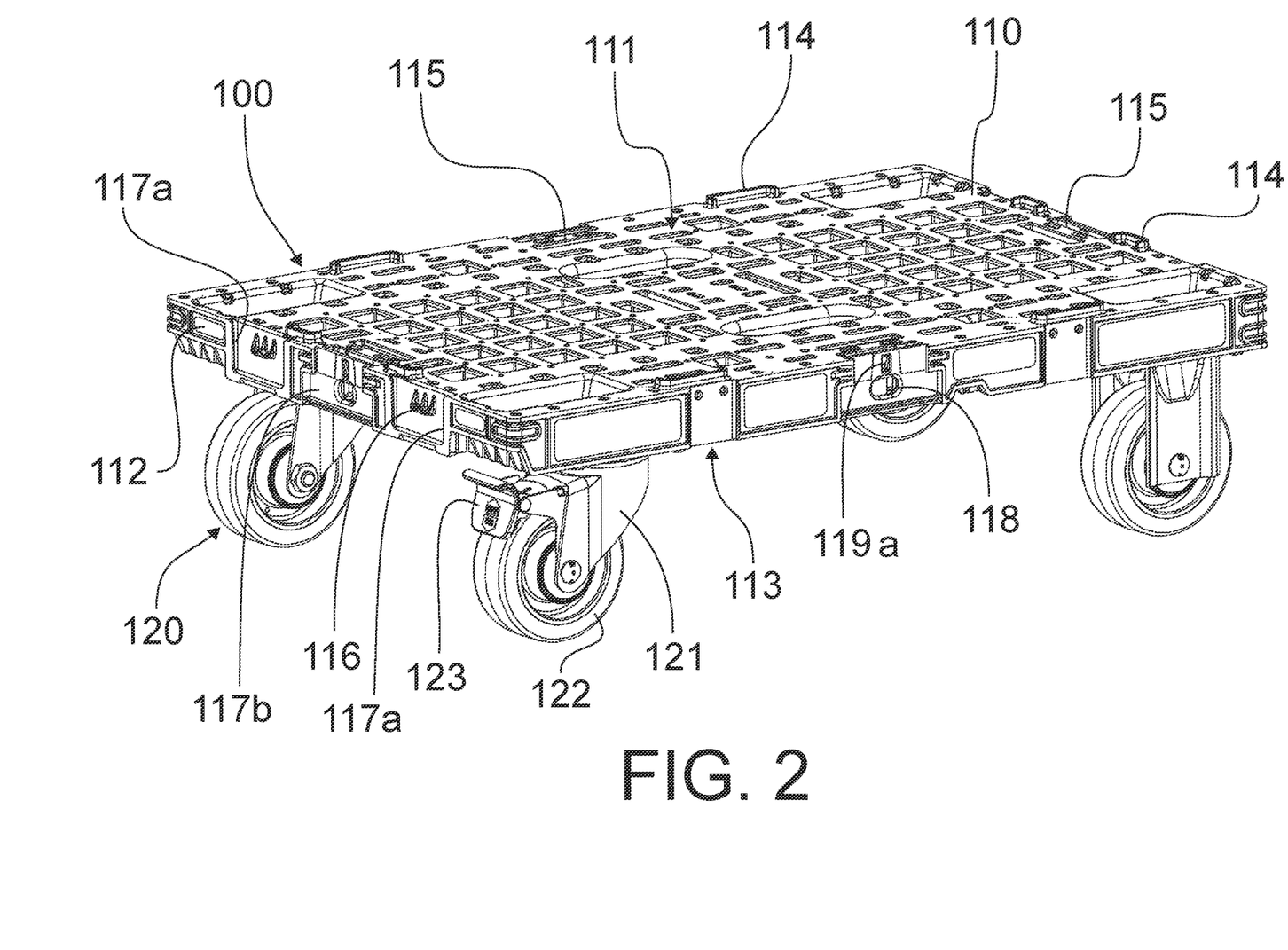
FIG. 2 illustrates a perspective view of the dolly of FIG. 1.

Looking first at the dolly 100 shown in FIG. 2 it may be seen that that the dolly 100 has a universally typical structure in that it features a generally prismatic deck 110 and four casters 120 mounted to the bottom 113 of the deck 110. To be precise the generally prismatic shape of the deck 110 is formed by a top load carrying surface 111 and an approximately parallel bottom 113. The top load carrying top surface 111 is connected to the bottom 113 by a flank 112, which is made up by four successive sides which extend orthogonally from the top load carrying top surface 111. The deck 100 includes conventional wheel recesses provided to the top load carrying surface 111 for receiving the wheels of another dolly superposed thereon. The deck 110 or at least the load carrying surface or flank or both may be symmetrical in respect one or both center line(s) (shown in dot-and-dash line) that is/are parallel to the horizontal Cartesian dimension of the deck 110. In the shown example the load carrying surface 111 is symmetrical to both center lines, whereby any reference to a feature in the deck 110 may be multiplied accordingly.

The deck 110 of the dolly 100 has been provided with several locking means for securing the superstructure 200 to the deck 110. These locking means may be divided into two categories: locking means that prevent horizontal displacement of the superstructure and locking means that prevent vertical displacement of the superstructure. For preventing horizontal displacement, the deck 110 features locking protuberances 114 that extend from the load carrying surface 111. The locking protuberances 114 are preferably placed on the periphery of the top load carrying surface 111. In this context the term periphery refers to the area of the top load carrying surface 111 that is located at the outermost 20 percent of the extension in a given dimension. For example, if the deck 110 extends to cover an area of 40 cm×60 cm, the outermost 20 percent would be the area extending between the edge of a side and a point measured 8 cm and 12 orthogonally from the edge of each side, respectively. The locking protuberances are spaced apart from each other. In the shown example the deck 110 features eight locking protuberances 114; two per side. Accordingly, it may be seen that a partial rim is formed on the top load carrying surface 111. The locking protuberances 114 are relatively short. The purpose of the locking protuberances 114 is to provide lateral support for the superstructure 200, wherein it is not purposeful for the protuberance 114 to be excessively tall. Preferably the protuberances are no taller than the thickness of the second section 220 of the superstructure 200. The protuberances 114 may, for example, have a height between 5 to 10 mm from the top load carrying surface 111, e.g. 6 mm. The locking protuberances 114 may exhibit various different shapes. In the illustrated example the locking protuberances 114 exhibit a letter C shape when viewed from above. The shape is preferably such to provide lateral support in both lateral dimensions. C shape may, for example, be selected to provide such lateral support but also to fit into an opening at the bottom of a crate. The shape of the protuberance is preferably rotationally non-symmetrical. Other examples include quadrilateral, oval, and hexagonal shapes.

The locking protuberances 114 on the top load carrying surface 111 form the male counterpart of an interface between the dolly 100 and the superstructure 200. Accordingly, the female counterpart of the interface is provided to the superstructure 200 in the form of receptive cavities 221 for receiving the respective plurality of locking protuberances 114 of the load carrier 100. In the sleeve embodiments of the FIGURES the superstructure 200 includes a first section 230 which extends orthogonally from the top load carrying surface 111, when the superstructure 200 is attached to the deck 110. The first section 230 matches the periphery of the deck 100 so as to maximize the inner volume of the dolly 100. The receptive cavities 221 are provided to the bottom of the superstructure 200. In the shown example, the superstructure 200 includes a second section 220 which extends from the first section 230 in a straight angle and, thus, along the load carrying surface 111. To be more precise, the second section 220 extends orthogonally inward in respect to the first section 230, i.e. from the periphery towards the center of the load space. The receptive cavities 221 are provided as openings to the second section 220 for receiving the locking protuberances 114. In the illustrated example, the superstructure 200 features three sides and is thus open at one side (facing the viewer). Accordingly, the superstructure forms an open profile featuring three successively and at right angles interconnected panels forming the first section 230 and respective three successively and at right angles interconnected panels forming the second section 220. The cavities 221 take the form of openings provided to the second section 220 that extends along the top load carrying surface 111. The openings are dimensioned so as to fit the protrusions 114 in a relatively tight manner for maximizing the lateral support provided by the interface between the male 114 and female 221 counterparts of the interface between the superstructure 200 and the dolly 100.

With the superstructure 200 attached to the dolly 100 the fit between the locking protuberances 114 and the recesses 221 provides lateral support for the superstructure 200 in that horizontal sliding of the superstructure 200 is prevented. If the superstructure includes a section extending along the top load carrying surface 111 of the deck, the superstructure 200 is further pressed against the deck 110 by the cargo. Compared to conventional logistics systems employing only vertically locking tabs, the improvement is considerable.

According to an unillustrated embodiment, the superstructure does not include such a second section, i.e. a skirt section. Accordingly, the superstructure comprises an upwardly extending first section which matches the periphery of the deck without a section extending along the deck. In such an embodiment the receiving cavities may be recesses formed to the bottom periphery of the first section, i.e. the sleeve section. The structure of the superstructure may be relatively thick wherein the receiving cavity may be a cutout or otherwise carved portion formed on the bottom of the periphery of the superstructure. Alternatively the superstructure may be a laminated from, e.g., three sheets, wherein the center sheet has a cutout for receiving the locking protuberance.

As mentioned above, the logistics system 1000 features also locking means that prevent vertical displacement of the superstructure. For preventing vertical displacement, the logistics system 1000 includes a locking interface formed by respective counterparts provided to the dolly 100 and the superstructure 200. The female counterpart is provided to the dolly 100 in the form of at least one, preferably several vertical slots 115, 117 for receiving a cooperating male counterpart, i.e. a tab 210) provided to the superstructure 200. In the illustrated example, the deck 100 has three sets of slots: a first set of outer slots 117a provided to the flank 112, a second set of outer slots 117b provided to the flank 112, and a third set of inner slots 115 provided to the top load carrying surface 111.

Figure 4:
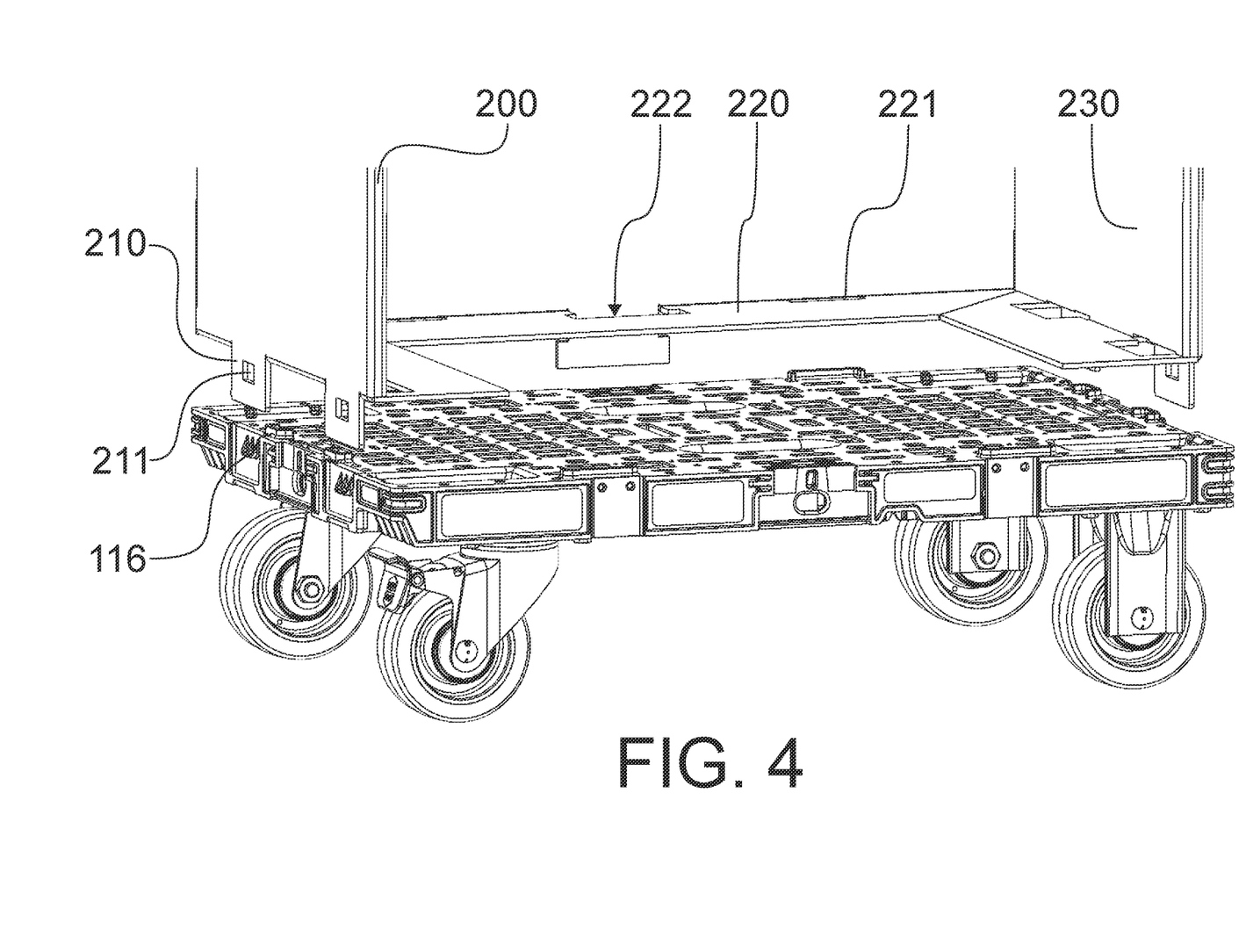
FIG. 4 illustrates a partial perspective explosion view of the logistics system of FIG. 1.

First, let us turn to the first set of outer slots 117a on the flank 112. The shorter sides of the deck 110 each have two such outer slots 117a for providing bending stiffness to the superstructure 200 when loaded laterally. Accordingly, the dolly 100 has four such slots 117a. The slots 117a are open from the side and feature a guide for the introduction of a tab 210 from above. In the shown example the guide takes the form of two opposing side edges such shaped to provide for a straight channel into which the tab 210 may be inserted. The first set of slots 117a have straight side edges for receiving and holding similarly straight edged tabs 210 on the cooperating superstructure 200 (FIG. 4). The tabs 210 are secured to the slots 117a by means of a locking claw 116 protruding from the flank 112, i.e. from the rear wall of the slot 117a. Accordingly, the tab 210 of the superstructure 200 comprises a corresponding respective opening 211 for receiving and to be secured by the locking claw 116. In the illustrated example, both the locking claw 116 and the opening 211 have a generally quadrangular shape when viewed in plan view. However, the locking claw 116 is slanted when viewed in a side view for allowing downward insertion of the tab 210 into the slot 117a. During insertion the leading edge of the tab 210 will follow the contour of the slanted locking claw 116. The side parts of the tab 210 will travel in the channel formed by the side edges of the slot 117a and the center part of the tab 210 will become distorted to go past the locking claw 116 until the opening 211 is aligned with the locking claw 116. When the tab 210 is fully inserted, the leading edge of the tab 210 is engaged with the bottom of the slot 117a and the locking claw 116 is inserted into the opening 211 of the tab 210. Accordingly, the ejection of the tab 210 is prevented. The tab 210 may be eventually released from the slot 117a manually by lifting the tab 210 vertically and lifting the tab horizontally so as to lift the tab 210 past the locking claw 116.

Secondly, let us turn to the second set of outer slots 117*b* provided to the flank 112. The second set of outer slots 117*b* is what is generally referred to as a T-slot which are known per se. The second type of slot 117*b* is different from the first type of slot 117*a* in that the locking of the tab (now shown) is provided by an interconnection of a positive locking shape between the tab and the slot. In the shown example the T-slot 117*b* features a straight edged narrow top portion and a straight edged wide bottom portion. The shoulder formed between the top and bottom portion acts as a restraint for a tab of a similar shape. During insertion the tab is bent by the user to match the slot. With the tab inserted it is held in place by the channel formed by the opposing straight edges of the narrow top portion. Such T-slots may be provided to diversify the dolly 100 to accommodate various different superstructures. In the shown embodiment (FIG. 2), the second type of outer slot 117*b* is provided between two adjacent outer slots 117*a* of the first type.

Figure 5:
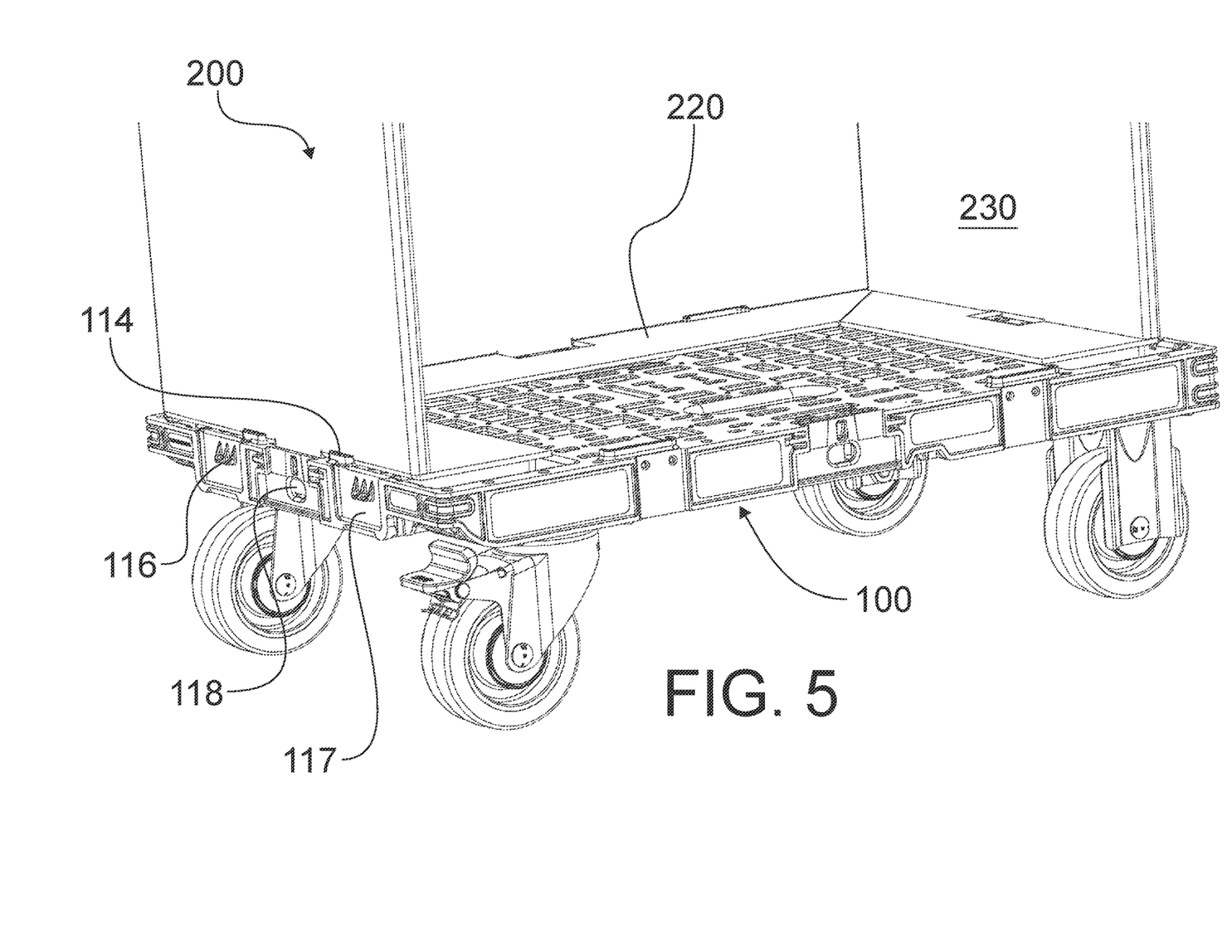
FIG. 5 illustrates a partial perspective view of a logistics system according to modified embodiments.
Figure 6:
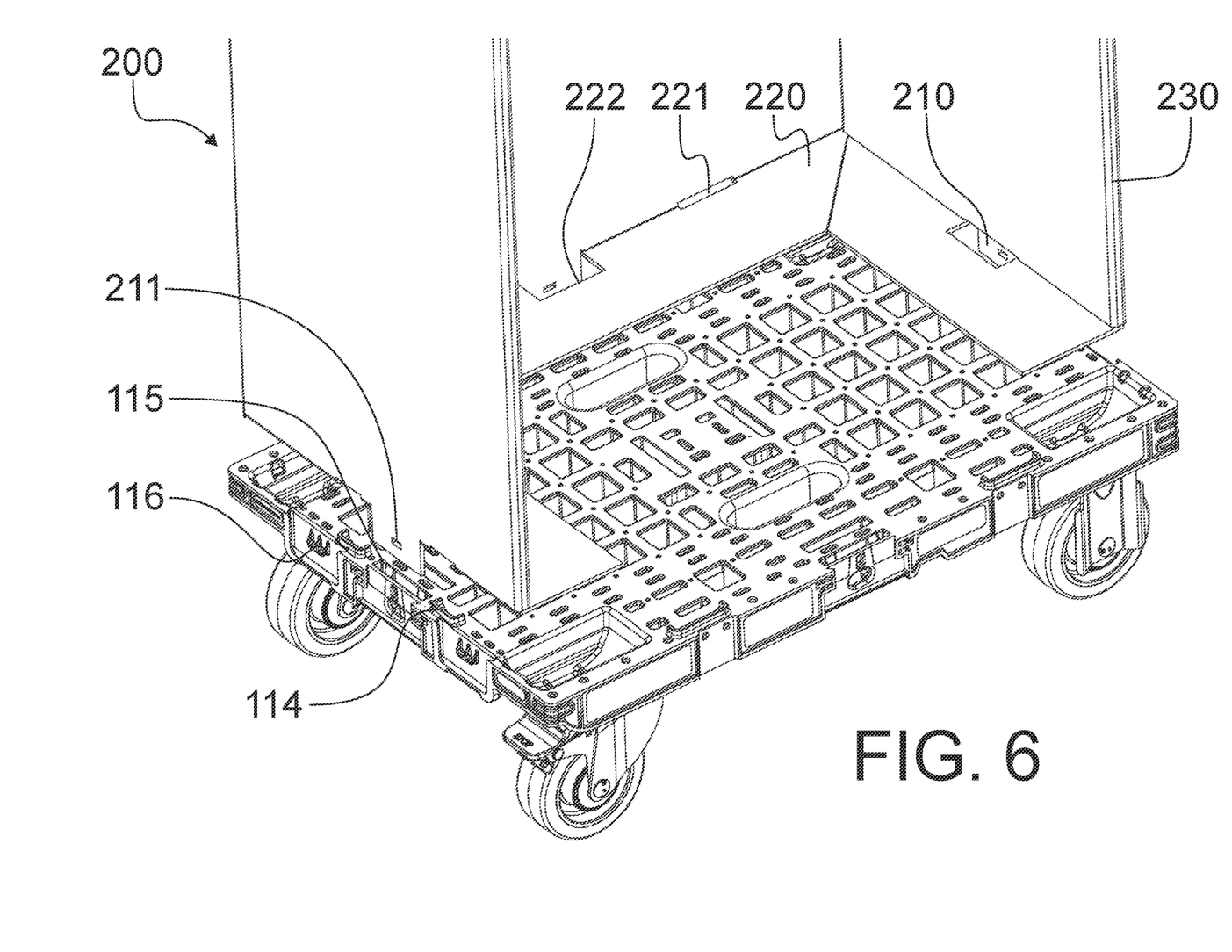
FIG. 6 illustrates a partial perspective explosion view of the logistics system of FIG. 5.

Thirdly, let us study the third set of slots 115 that are provided to the top load carrying surface 111 of the deck 110. These inner slots 115 are intended to receive tabs 210 which are offset inward from the outer edge of the first portion 230 of the superstructure 200 (FIGS. 5 and 6). The shown dolly 100 comprises four such slots 115 provided to the periphery of the top load carrying surface 111. The slots 115 may, as shown, be located on the center line of the given side of the deck 110. The slots 115 extend downward from the top load carrying surface 111 to form a receptive volume for the tab 210. Similarly to the first type of slot 117*a* on the flank 112, the inner slot 115 and the cooperating tab 210 have a locking interface to prevent inadvertent ejection of the tab 210. The locking interface features locking claws 119*a*, 119*b* that extend inward from the walls defining the recess 115 into the receptive space thereof so as to secure the tab 210 into place.

Figure 3:
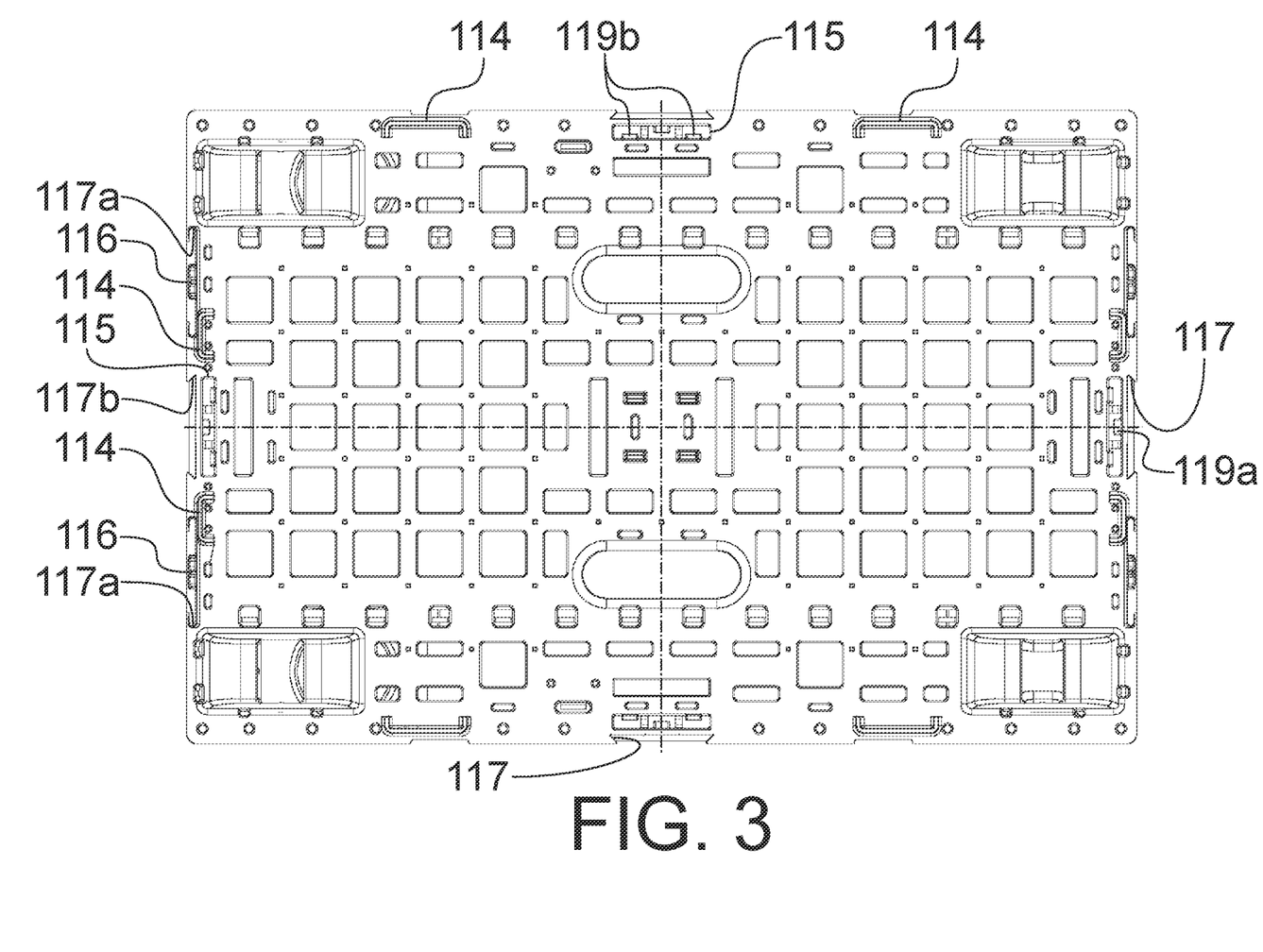
FIG. 3 illustrates a top plan view of the deck of the dolly of FIG. 1.

As best shown in FIG. 3, the locking claws 119*a*, 119*b* of the recess 115 are divided into two groups based on the function. On the one hand, the recess 115 has a primary locking claw 119*a* which is intended to engage a corresponding opening 211 in the tab 210. In other words, the primary locking claw 119*a* has a penetrative function. On the other hand, the recess has two secondary locking claws 119*b* which are intended to assist locking in that they squeeze the tab 210. In other words, the secondary locking claws 119*b* have a guiding function. The secondary locking claws 119*b* are spaced apart from each other and located on the wall opposing the primary locking claw 119*a* so as to establish a jaw. In such a jaw arrangement, the primary locking claw 119*a* is positioned between the secondary locking claws 119*b* on the opposing wall of the recess 115. The locking claws 119*a*, 119*b* of the inner slots 115 are similarly slanted as those of the outer slots 117*a*. The secondary claws 119*b*, when positioned as described, also serve the purpose of assisting bending of the tab 210 during insertion so as urge the primary locking claw 119*a* into the receptive opening 211 on the tab 210. Naturally, the secondary locking claws 119*b* may be dispensed with and the number and location of the locking claws 119*b* varied.

The embodiment shown in FIGS. 5 and 6 which employs inwardly offset tabs 210) also features a modified locking means for preventing horizontal displacement of the superstructure, i.e. for providing lateral support. In contrast to the prominent openings 221 formed on the second section 220 in the embodiment of FIGS. 1 to 4, the recesses 221 of the embodiment of FIGS. 5 and 6 are more subtle. As shown in FIG. 6, the recesses 221 are narrow openings formed to the fold between the first and second section 230, 220 of the superstructure. It can also be seen that the tabs 210 are cut strips from the second section 220 leaving a cutout 222 on the second section 220. Accordingly, the superstructure 200 may be manufactured from a sheet by performing die cutting and creasing.

FIGS. 5 and 2 reveal a release opening 118 for releasing the tab 210 from the slot 115 on the top load carrying surface 111 of the deck 110. The release opening 118 is provided to the flank 112 to provide a passageway to the receptive space of the slot 115 from the side of the deck 110. The purpose of the release opening 118 is to enable release of the tab 210 from the locking claw 119*a* by pushing through the release opening 118, e.g. with a finger, pen, or a thin tool. Accordingly it is preferable to locate the primary locking claw 119*a* on the same inner wall of the recess 115 so that the release motion of a finger, for example, through the release opening 118 will push the tab 210 off the primary locking claw 119*a*, whereby the tab 210 may be lifted off the deck 110.

The superstructure 200 has been illustrated as being a sleeve. It is to be understood that the superstructure could also be constructed as a box or similar merchandising unit, e.g. a rack or solitary wall. To promote the insertion and release of the tab from the corresponding slot on the dolly, the material of the superstructure or at least the tab thereof is preferably compliant so as to allow bending required for the interaction between the tab and slot. Accordingly, the superstructure 200 is preferably made of sheet material, such as cardboard, plastic sheet, or channel plastic. Other elastically deformable materials are also foreseen.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", i.e. a singular form, throughout this document does not exclude a plurality.

REFERENCE SIGNS LIST

| No. | Element |
| --- | --- |
| 100 | dolly |
| 110 | deck |
| 111 | top load carrying surface |
| 112 | flank |
| 113 | bottom |
| 114 | locking protrusion |
| 115 | inner slot |
| 116 | locking claw |
| 117a | outer slot |
| 117b | outer slot |
| 118 | release opening |
| 119a | primary locking claw |
| 119b | secondary locking claw |
| 120 | caster |
| 121 | fork |
| 122 | wheel |
| 123 | break mechanism |
| 200 | superstructure |
| 210 | tab |
| 211 | opening |
| 220 | second section |
| 221 | cavity |
| 222 | cutout |
| 230 | first section |
| 1000 | logistics system |

The invention claimed is:

1. A logistics system comprising:
a load carrier comprising:
a deck defining an outermost periphery and comprising a top load carrying surface and a flank,
a plurality of locking protuberances extending from and being arranged spaced apart from one another on the load carrying surface of the deck, and
a superstructure, which is a merchandising unit made of sheet material and configured to be attached to the load carrier at the outermost periphery, and comprising:
a first section configured to extend from the load carrying surface of the load carrier, and
a plurality of receptive cavities for receiving the respective plurality of locking protuberances of the load carrier.

2. The logistics system according to claim 1, wherein the deck is generally prismatic in that the load carrying surface is the top surface and the flank is formed by the side surfaces extending downward from the load carrying surface.

3. The logistics system according to claim 1, wherein the plurality of locking protuberances extend from and are arranged spaced apart from one another on the periphery of the load carrying surface of the deck.

4. The logistics system according to claim 1, wherein:
the load carrier comprises a slot which is provided to the flank of the load carrier so as to receive and hold a cooperating tab of the cooperating superstructure and wherein
the superstructure comprises a cooperating tab which is configured to be inserted into the respective slot on the flank of the load carrier.

5. The logistics system according to claim 4, wherein the slot is open from the side and comprises a guide for the introduction of the tab from above.

6. The logistics system according to claim 4, wherein:
the load carrier comprises a plurality of such slots arranged on the flank of the deck, and wherein
the superstructure comprises a respective plurality of tabs.

7. The logistics system according to claim 4, wherein:
the slot comprises a locking claw protruding from the flank of the deck, and wherein
the tab of the superstructure comprises a respective opening so as to receive and to be secured by the locking claw.

8. The logistics system according to claim 1, wherein the deck comprises a slot provided to the load carrying surface for receiving a tab of the superstructure, the slot comprising at least one primary locking claw extending into a recess so as to secure the tab into place.

9. The logistics system according to claim 8, wherein:
the slot comprises at least one secondary locking claw extending inward from the side walls defining the recess into the receptive space thereof, and wherein
at least two of the plurality of locking claws are arranged to oppose each other so as to establish a jaw.

10. The logistics system according to claim 7, wherein the locking claw is slanted so as to allow downward insertion of the tab into the slot or inner slots and to prevent ejection of the tab by pulling up once engaged to the opening of the tab.

11. The logistics system according to claim 8, wherein the flank of the deck comprises a release opening providing a passageway to the recess so as to enable release of the tab from the locking claw by pushing through the release opening.

12. The logistics system according claim 1, wherein the first section of the superstructure is configured to match the periphery of the load carrying surface of the load carrier.

13. The logistics system according to claim 12, wherein the superstructure comprises a second section which extends from the first section so as to extend along the load carrying surface of the load carrier, the second section comprising the plurality of receptive cavities for receiving the respective plurality of locking protuberances of the load carrier.

14. The logistics system according to claim 13, wherein the first section of the superstructure is configured to extend orthogonally in respect to the load carrying surface of the deck, whereas the second section is configured to extend orthogonally inward in respect to the first section.

15. The logistics system according to claim 1, wherein the load carrier is a wheeled platform.

16. The logistics system according to claim 15, wherein the merchandising unit is a sleeve, box, or similar merchandising unit.

17. The logistics system according to claim 16, wherein the merchandising unit is made of cardboard, plastic sheet, or channel plastic.

18. A load carrier comprising:
a deck comprising a top load carrying surface,
a plurality of locking protuberances extending from and being arranged spaced apart from one another on the load carrying surface of the deck, and
a slot on the load carrier so as to receive and hold a cooperating tab of a cooperating superstructure for providing vertical locking,
wherein the load carrier is configured to receive a superstructure, which is a merchandising unit, and which is configured to be attached to a load carrier and comprises:
a first section configured to extend from the periphery of the load carrying surface of the load carrier,
a second section extending orthogonally from the first section so as to extend along the load carrying surface of the load carrier, the second section comprising a plurality of cavities for receiving the respective plurality of locking protuberances of the load carrier, and
a tab configured to be inserted into the respective slot on the flank of the load carrier.

19. A superstructure, which is a merchandising unit that is made of sheet material and which superstructure is configured to be attached to a load carrier and comprises:
a first section configured to extend from the periphery of the load carrying surface of the load carrier,
a second section extending from the first section so as to extend along the load carrying surface of the load carrier, the second section comprising a plurality of cavities for receiving respective ones of a plurality of locking protuberances of the load carrier, and
a tab configured to be inserted into a respective slot on the flank of the load carrier.

* * * * *